Patented Jan. 29, 1924.

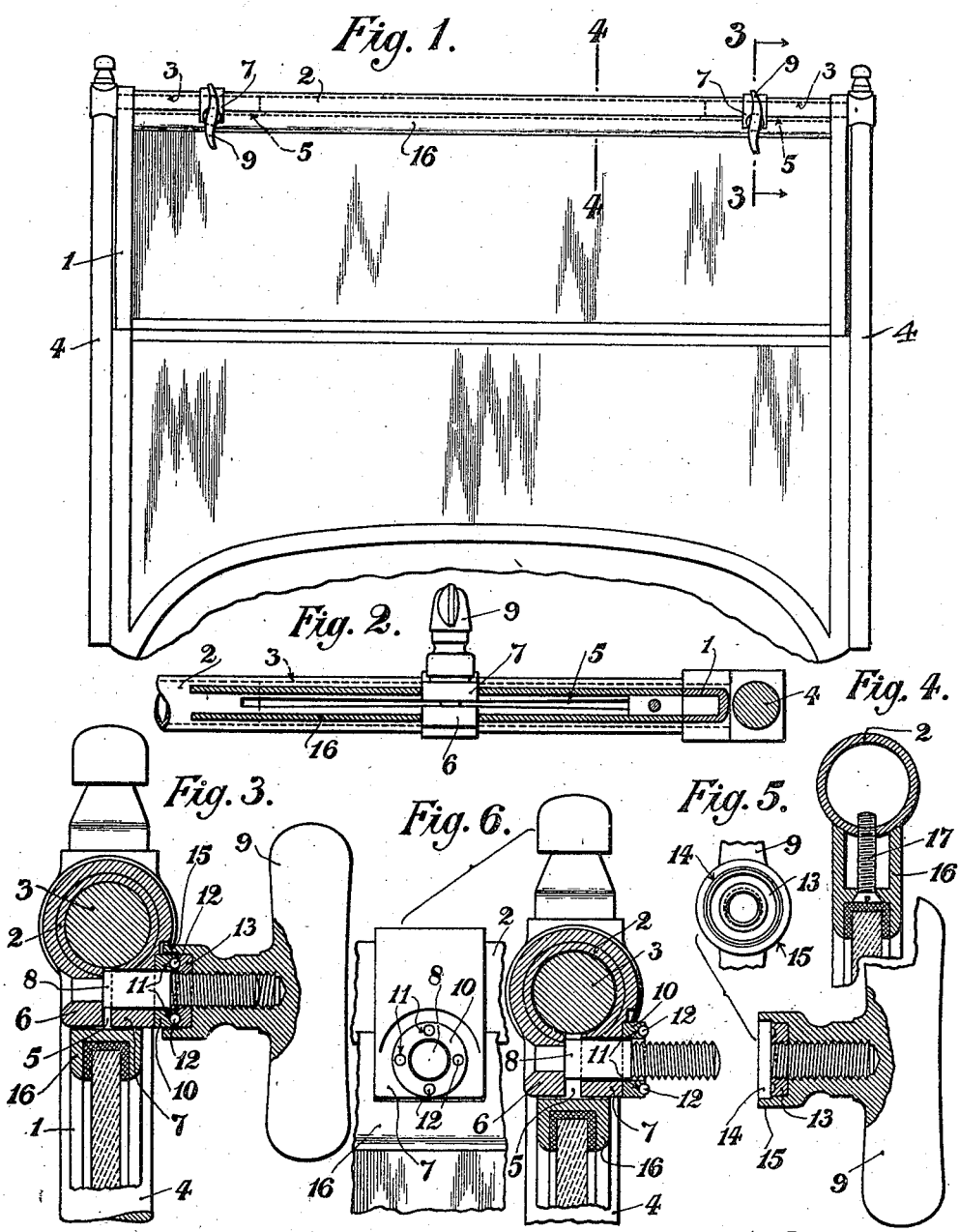

1,482,210

UNITED STATES PATENT OFFICE.

ARTHUR COLLINS AUSTER, OF BIRMINGHAM, ENGLAND, ASSIGNOR TO AUSTER LIMITED, OF BIRMINGHAM, ENGLAND.

ADJUSTABLE HINGE OR JOINT FOR WINDSCREENS OF MOTOR CARS AND THE LIKE.

Application filed March 29, 1922. Serial No. 547,672.

*To all whom it may concern:*

Be it known that I, ARTHUR COLLINS AUSTER, subject of the King of Great Britain, residing at the city of Birmingham, England, have invented certain new and useful Improvements in Adjustable Hinges or Joints for Windscreens of Motor Cars and the like, of which the following is a specification.

This invention relates to adjustable hinges or joints for the wind-screens of motor-cars and the like, said hinges or joints being of that type comprising a split outer tube carrying the glass screen and adapted to be contracted by a screw or nut into frictional engagement with a fixed inner rod carried by the side standards or attachment members of the screen. In this type of hinge the outer tube is contracted by means of lugs on opposite side of the slit adapted to be pressed together by means of a thumb-screw or nut; but in the contraction of the tube a considerable amount of friction is occasioned between the screw or nut and the lug upon which it bears, so that a proportion of the turning effort exerted in tightening the screw or nut has been utilized or absorbed in overcoming the said friction between the screw or nut and the lug, and consequently it has not been possible to exert such an effective pressure upon the inner rod as would be possible were the said friction eliminated or reduced.

The object of the present invention is to reduce to a minimum the aforesaid friction between the screw or nut and the lug with which it engages, when the outer tube is contracted in order to lock the joint, thus admitting of substantially the full turning effort which is applied to the screw or nut, being utilized for the contraction of the said outer tube.

According to the invention, a ball thrust bearing is provided between the screw or nut and the face of the lug upon which the said screw or nut bears.

Figure 1 of the accompanying drawings is an elevation of a wind-screen having a hinge in accordance with the present invention.

Figure 2 is a horizontal section through the frame of the screen showing the split tube in underside plan.

Figure 3 is a transverse section on line 3—3—, Figure 1, upon a larger scale.

Figure 4 represents a transverse section on line 4—4, Figure 1.

Figure 5 shows the clamping nut in sectional elevation and in end elevation.

Figure 6 shows that portion of the hinge adjacent the lugs on the split tube, in elevation and section, the nut being removed.

The frame 1 of the glass screen is carried by a horizontal tube or sleeve 2 which surrounds and is capable of turning upon a pair of inner rods 3, 3 fixed respectively to the side standards 4 of the screen. Upon its underside this tube 2 is slit longitudinally at 5 from each end for a portion of its length, and fixed or cast upon the tube upon opposite sides of each slit is a pair of separated lugs 6, 7, of which the lug 6 carries a fixed screw-pin 8 passing through a plain hole in the other lug 7 and having a nut 9 fitted upon it, by which the lugs can be pressed together and the outer split tube contracted about the inner member 3 in order to fix the screen in its adjusted position.

According to the present invention, fixed upon the face of the lug 7 with which the nut co-operates, is a washer or collar 10 secured by soldering, brazing or otherwise, in a position concentric with the plain hole in the said lug. This washer or collar is drilled with four or other number of holes or recesses 11 in its front face, and in each of these holes or recesses a steel anti-friction ball 12 is placed, so as to project from the face of the washer or collar, said balls being retained in place within the holes or recesses by closing-in the metal at the edges of such holes or recesses.

The nut 9 which may be of brass and provided with wings, has secured upon or within its end a hardened steel bush or ring 13 to form a ball race to engage the balls 12 in the washer or collar 10. Thus, friction between the nut 9 and the lug 7, during the screwing-up of the nut, is practically eliminated, and thus the full turning effort applied to the nut is available for the contraction of the split tube around the inner member, whereby a very secure locking of the screen can be obtained.

Preferably the ball race ring is enclosed within a recess 14 in the nut, and the annular flange 15 of the recess may extend over and conceal the joint between the ball race and the ball retaining collar on the lug.

The slits 5 in the tube 2 are adapted to be covered by the channel 16 attached to the tube by screws 17 (Figure 4).

Instead of a nut screwing upon a pin fixed upon one of the lugs, a rotatable screw-pin may be screwed into a tapped hole in the one lug so that the head of the pin bears upon the other lug. In this form, a ball-race is secured within or upon the underside of the head so as to engage the balls in the collar or washer on the lug.

Having fully described my invention, what I desire to claim and secure by Letters Patent is:—

An adjustable hinge for wind-screens of motor-cars comprising a fixed inner member, a split outer tube rotatable about the fixed inner member, lugs upon opposite sides of the slit in the outer tube, a screw-pin carried by one of the lugs and passing through a plain hole in the other lug, a rotatable screw clamping device on the screw pin said screw clamping device being recessed in the end opposed to the lug with the plain hole, a ball race member located within the recess so that the walls of the latter extend beyond the said race member, and a collar fixed upon the lug with the plain hole and having recesses in its face, and anti-friction balls located and retained in said recesses and engaged by the ball race member within the recess in the clamping member.

In testimony whereof I have hereunto set my hand in presence of two subscribing witnesses.

ARTHUR COLLINS AUSTER.

Witnesses:
W. L. SKERRETT,
W. S. SKERRETT.